(12) United States Patent
Cope

(10) Patent No.: US 6,875,979 B2
(45) Date of Patent: Apr. 5, 2005

(54) THERMAL IMAGING CALIBRATION SYSTEMS AND METHODS

(75) Inventor: Richard D. Cope, Santa Barbara, CA (US)

(73) Assignee: Indigo Systems Corporation, Goleta, CA (US)

( * ) Notice: Subject to any disclaimer, the term of this patent is extended or adjusted under 35 U.S.C. 154(b) by 292 days.

(21) Appl. No.: 10/264,400

(22) Filed: Oct. 3, 2002

(65) Prior Publication Data
US 2004/0065822 A1 Apr. 8, 2004

(51) Int. Cl.[7] ............................................... G12B 13/00
(52) U.S. Cl. ............... 250/252.1; 250/330; 250/339.03; 250/339.09
(58) Field of Search ............................. 250/252.1, 330, 250/332, 339.03, 339.04, 339.09

(56) References Cited

U.S. PATENT DOCUMENTS

| | | | | |
|---|---|---|---|---|
| 4,419,692 A | * | 12/1983 | Modisette et al. ........... 348/167 |
| 5,023,459 A | * | 6/1991 | Osborn et al. ............... 250/332 |
| 5,354,987 A | * | 10/1994 | MacPherson ............ 250/252.1 |
| 5,373,151 A | * | 12/1994 | Eckel et al. ............. 250/208.1 |
| 5,471,047 A | * | 11/1995 | Even-Sturlesi et al. .. 250/208.1 |
| 5,756,999 A | | 5/1998 | Parrish et al. ............... 250/332 |
| 5,864,135 A | * | 1/1999 | Smith et al. ............. 250/252.1 |
| 6,028,309 A | | 2/2000 | Parrish et al. ............... 250/332 |
| 6,184,529 B1 | * | 2/2001 | Contini ....................... 250/347 |
| 6,394,646 B1 | * | 5/2002 | Ringermacher et al. ....... 374/7 |
| 2003/0183756 A1 | * | 10/2003 | Huniu ..................... 250/252.1 |

* cited by examiner

Primary Examiner—Albert Gagliardi
(74) Attorney, Agent, or Firm—MacPherson Kwok Chen & Heid LLP; Greg J. Michelson

(57) ABSTRACT

A calibration assembly employs a thermoelectric cooler to provide a calibration temperature for one calibration flag and a different calibration temperature for a second calibration flag. Either calibration flag is immediately available for insertion into the optical path when calibration of the thermal imaging device is required. Consequently, the time required to calibrate a thermal imaging device within a thermal imaging system is greatly reduced.

21 Claims, 6 Drawing Sheets

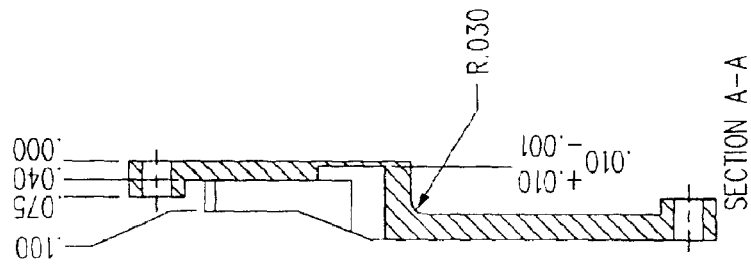
FIG. 12
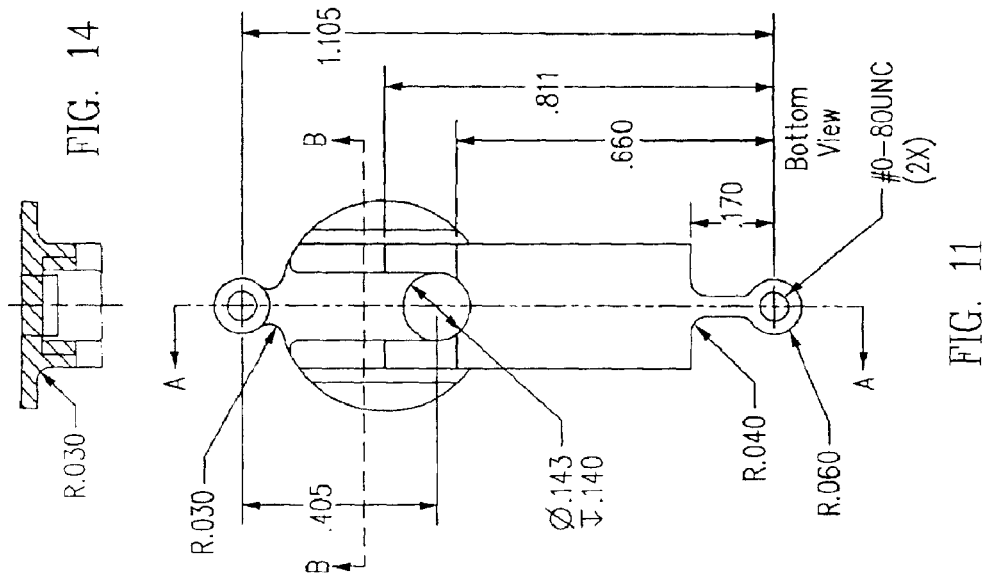
FIG. 14
FIG. 11
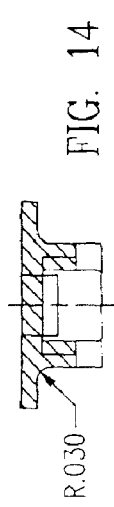
FIG. 10

THERMAL IMAGING CALIBRATION SYSTEMS AND METHODS

BACKGROUND

1. Field of the Invention

The present invention relates generally to thermal imaging systems and, more particularly, to systems and methods for calibrating thermal imaging devices, such as focal plane arrays.

2. Related Art

A focal plane array (FPA), which detects infrared radiation, is well known in the art. An FPA, for example, may be formed from an array of microbolometers, with each microbolometer functioning as a pixel to produce a two-dimensional image. The change in resistance of each microbolometer due to incident infrared radiation is translated into a time-multiplexed electrical signal by circuitry known as the read out integrated circuit (ROIC). The combination of the ROIC and the microbolometer array is commonly known as a microbolometer FPA or microbolometer infrared FPA. Microbolometers and FPAs are described in further detail in U.S. Pat. Nos. 5,756,999 and 6,028,309, which are herein incorporated by reference in their entirety.

Thermal imaging device performance, such as with a FPA for example, is typically degraded due to non-uniform responses among the individual microbolometer detectors to uniform incident infrared radiation. Factors contributing to the performance degradation include variations in the infrared radiation absorption coefficient, resistance, temperature coefficient of resistance (TCR), heat capacity, and thermal conductivity of the individual detectors. Because the magnitude of the non-uniformity can be substantially larger than the magnitude of the actual response due to the incident infrared radiation, various techniques are typically required to compensate for the non-uniformity and acquire the portion of the signal representing the incident infrared radiation.

FIG. 1 is a graph of pixel output (e.g., output voltage) for two microbolometers within an FPA as a function of photon flux (i.e., received incident infrared radiation). As lines 102 and 104 illustrate for the two corresponding microbolometers, the pixel outputs for a certain initial level of photon flux (e.g., at point 106) differs by a certain amount of pixel output offset. Furthermore, the amount of gain exhibited by the two microbolometers varies over a range of photon flux (e.g., between points 106 and 108), as indicated by the difference in the slope of lines 102 and 104.

Typically, the offset and gain of each infrared detector in the FPA is calibrated so that a more uniform response is obtained from the microbolometer FPA over the desired range of photon flux. For example, as shown in FIG. 2, the initial offsets for the two microbolometers are calibrated at point 106 to remove the non-uniform offset. The gain is then normalized, as shown in FIG. 3, for the two microbolometers over the photon flux range defined by points 106 and 108 to produce a more uniform response. Further details of calibration procedures may be found, for example, in U.S. Pat. Nos. 5,756,999 and 6,028,309.

Thermal imaging devices are typically periodically calibrated, such as upon power-up or at certain intervals during use, to minimize the non-uniform response from the FPA. For example, the FPA of the thermal imaging device may be calibrated over two or more levels of photon flux by inserting into the optical path a calibration flag (i.e., an optical obscuration). The temperature of the calibration flag is raised or lowered to provide the desired level of photon flux for the FPA. When the calibration flag reaches the required temperature and is inserted into the optical path of the thermal imaging device, the FPA takes one or more data frames or snapshots of the calibration flag to calibrate its response at that temperature. The temperature of the calibration flag can then be changed and the calibration process repeated at the new temperature. The data collected at the calibration points can then be used to calibrate the FPA to provide a more uniform response, as discussed above.

The calibration flag is typically coupled to a thermoelectric cooler (TEC), which is a small heat pump that heats or cools the calibration flag to the desired temperature (i.e., desired level of photon flux). The TEC is coupled to a heat sink, which is used to help maintain the desired temperature and prevent temperature elevation drift or overheating of the TEC or calibration flag. In some implementations, a fan may be used to further aid in maintaining the desired temperature range. A small motor or servo is typically used to translate or rotate the calibration flag into the optical path when calibration is desired.

One drawback of this technique is the significant time delay between calibration points due to the time required by the TEC to heat or cool the calibration flag from one temperature calibration point to the next. For example, one or more minutes may be required by the TEC to transition or slew the calibration flag between calibration temperature points. Another drawback is that the fan, servo, and heat sink detrimentally add to the size, weight, cost, and complexity of the thermal imaging device. Furthermore, the fan and servo are an additional power draw and may contribute undesired electromagnetic interference. As a result, there is a need for improved techniques for providing calibration for thermal imaging devices.

BRIEF SUMMARY

Thermal imaging calibration systems and methods are disclosed herein. In accordance with an embodiment of the present invention, a thermal imaging sensor calibration assembly is disclosed that employs a TEC to provide simultaneously two calibration temperatures for two corresponding calibration flags. Either calibration flag is immediately available for insertion into the optical path when calibration of the thermal imaging device is required. Consequently, the time required for calibration is significantly reduced (e.g., from minutes to seconds) because the time delay for slewing the temperature of a single calibration flag between calibration points has been eliminated. Furthermore, as described in greater detail herein, because the fan may be eliminated in some embodiments, the size, weight, cost, and complexity of the thermal imaging device is reduced along with its power demands.

More specifically, in accordance with one embodiment of the present invention, a calibration flag assembly includes a main body, a first calibration flag coupled to the main body, a first thermoelectric cooler coupled to the main body, and a second calibration flag coupled to the first thermoelectric cooler.

In accordance with another embodiment of the present invention, a method of calibrating a thermal imaging device includes operating a first thermoelectric cooler to adjust a temperature of a first calibration flag and a second calibration flag to a first calibration temperature and a second calibration temperature, respectively; inserting into an optical path of the thermal imaging device the first calibration flag; and inserting into the optical path the second calibration flag.

In accordance with another embodiment of the present invention, a thermal imaging system includes a thermal imaging sensor adapted to receive thermal radiation through an optical path and a calibration flag assembly that provides thermal calibration images, when inserted into the optical path, to assist in performing non-uniformity calibration. The calibration flag assembly includes a main body; a first calibration flag coupled to the main body; a first thermoelectric cooler coupled to the main body; and a second calibration flag coupled to the first thermoelectric cooler.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIGS. 10 through 14 show exemplary design specifications for the calibration flag assembly of FIGS. 4 and 5 in accordance with an embodiment of the present invention.

The preferred embodiments of the present invention and their advantages are best understood by referring to the detailed description that follows. It should be appreciated that like reference numerals are used to identify like elements illustrated in one or more of the figures.

DETAILED DESCRIPTION

Figure 1:
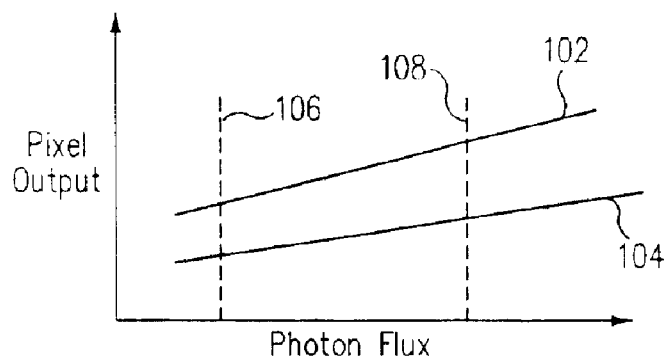
FIG. 1 is a graph of microbolometer pixel output as a function of photon flux.
Figure 2:
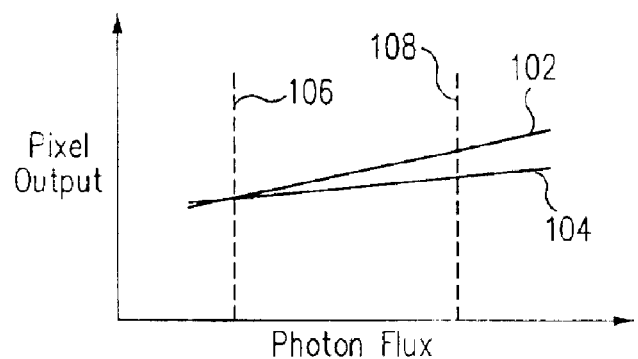
FIG. 2 is a graph of microbolometer pixel output as a function of photon flux after an offset adjustment.
Figure 3:
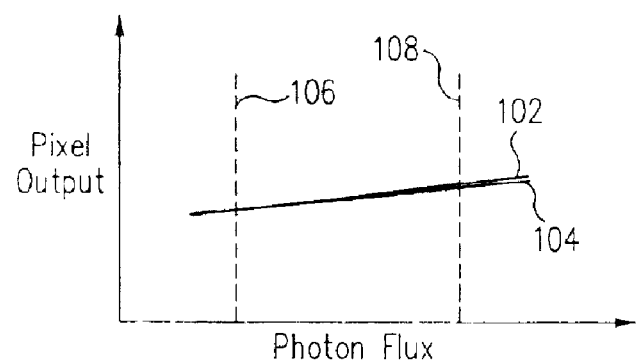
FIG. 3 is a graph of microbolometer pixel output as a function of photon flux after the offset adjustment and gain normalization.
Figure 4:
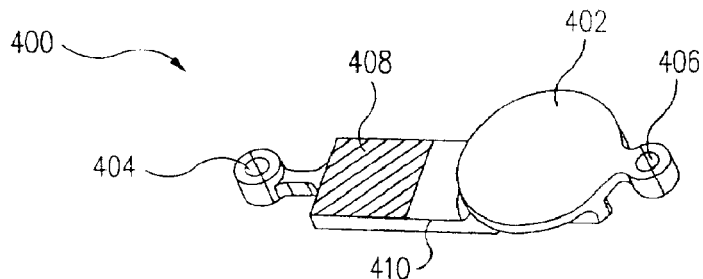
FIGS. 4 and 5 show top and bottom perspectives, respectively, of a calibration flag assembly in accordance with an embodiment of the present invention.
Figure 5:
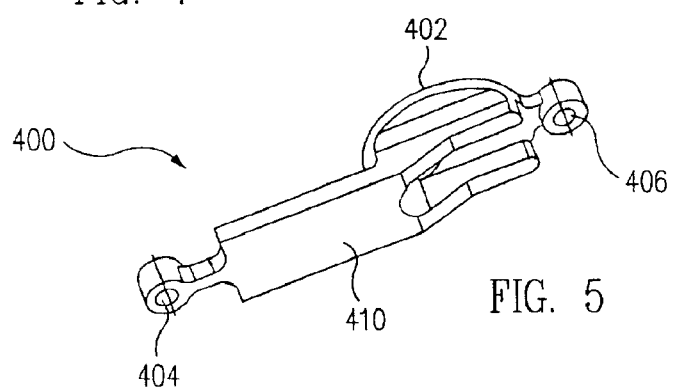
Figure 6:
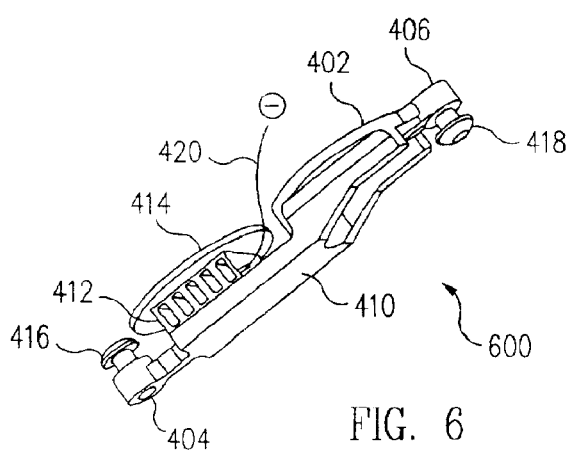
FIGS. 6 through 9 show various perspectives of a calibration flag assembly, which incorporates the calibration flag assembly of FIGS. 4 and 5 with a thermoelectric cooler and a second calibration flag, in accordance with an embodiment of the present invention.

FIGS. 4 and 5 show top and bottom perspectives, respectively, of a calibration flag assembly 400 in accordance with an embodiment of the present invention. Calibration flag assembly 400 includes a calibration flag 402, mounting holes 404, 406, a thermoelectric cooler (TEC) mounting area 408, and a main body 410. As explained further herein, calibration flag 402, which is coupled to main body 410, provides a surface having a controllable temperature that can be used by a thermal imaging device to calibrate its sensor (e.g., calibration procedures for an FPA such as disclosed in U.S. patent application Ser. No. 10/085, 226 entitled "Microbolometer Focal Plane Array Methods and Circuitry" filed Feb. 27, 2002, which is herein incorporated by reference in its entirety, or in U.S. Pat. Nos. 5,756,999 and 6,028,309 referenced earlier).

Mounting holes 404 and 406 are used to attach calibration flag assembly 400 to a thermal imaging system (e.g., in conjunction with screws, rivets, etc.). For example, calibration flag assembly 400 may be coupled to a thermal imaging sensor calibration assembly (TISCA), as discussed herein, which is part of a thermal imaging system. TEC mounting area 408 allows for the attachment of a TEC and an additional calibration flag, as shown in the following figures.

FIGS. 6 through 9 show various perspectives of a calibration flag assembly 600, which incorporates calibration flag assembly 400 of FIGS. 4 and 5 with a thermoelectric cooler (TEC) 412 and a calibration flag 414, in accordance with an embodiment of the present invention. Calibration flag assembly 600 is shown with mounting screws 416, 418 to secure calibration flag assembly 600 within the thermal imaging system, such as shown in the exemplary embodiment of FIG. 16. For example, mounting holes 404, 406 may be threaded to assist in securing calibration flag assembly 600.

TEC 412 may be secured to calibration flag 414 and to calibration flag assembly 400 by various methods, such as adhesive bonding, compression using thermal grease, or solder. TEC 412 is a small heat pump that operates on direct current and may be used for heating or cooling depending upon the direction of current flow, which moves heat from one side of TEC 412 to the other by the use of current flow and the laws of thermodynamics. The direction of current flow through TEC 412 is controlled by the application of a direct current source to a negative terminal 420 and a positive terminal 422 of TEC 412.

TEC 412 may be any type of heating/cooling device. For example, Marlow Industries, Inc.™ of Dallas, Tex. produces a number of different types of TECs suitable for one or more embodiments of the present invention. In general, TEC 412 has a cold side, which calibration flag 414 is coupled to, and a hot side, which calibration flag 402 is coupled to through main body 410 of calibration flag assembly 400. Thus, calibration flag assembly 400 serves the dual purpose of a heat sink for TEC 412 and as a thermal channel between calibration flag 402 and TEC 412.

In operation, by the application of an appropriate direct current source to terminals 420, 422 (i.e., a positive voltage applied to positive terminal 422 and a less positive voltage applied to negative terminal 420), TEC 412 will cool calibration flag 414 and heat calibration flag 402 simultaneously. Consequently, calibration flags 402, 414 may each reach a desired calibration temperature at approximately the same time, with either available for insertion into the optical path to calibrate the thermal imaging device.

The time required for calibration flags 402, 414 to reach the desired temperature could be estimated by the following equation:

$$t = [(\rho)(V)(Cp)(T1-T2)]/Q$$

where t is the time (seconds), $\rho$ is the density (g/cm$^3$), V is the volume (cm$^3$), Cp is the specific heat (J/g °C.), T1−T2 is the temperature change (°C.), and Q represents $(Qt_o + Qt_t)/2$ (J/s with 1 J/s=1 W). $Qt_o$ is the initial heat pumping capacity when the temperature difference across the cooler is zero. $Qt_t$ is the heat-pumping capacity when the desired temperature difference is reached and heat-pumping capacity is decreased. $Qt_o$ and $Qt_t$ are used to obtain an average value.

Figure 13:
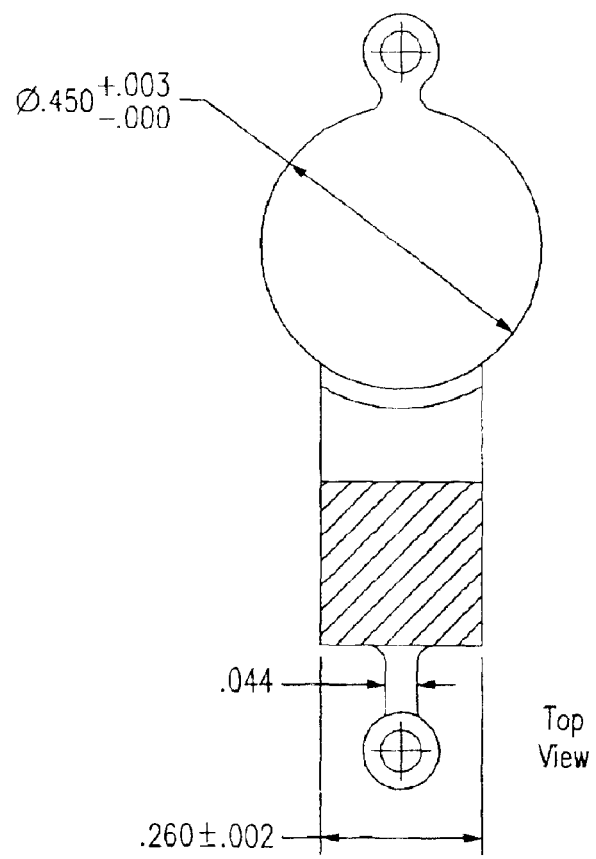
Figure 15:
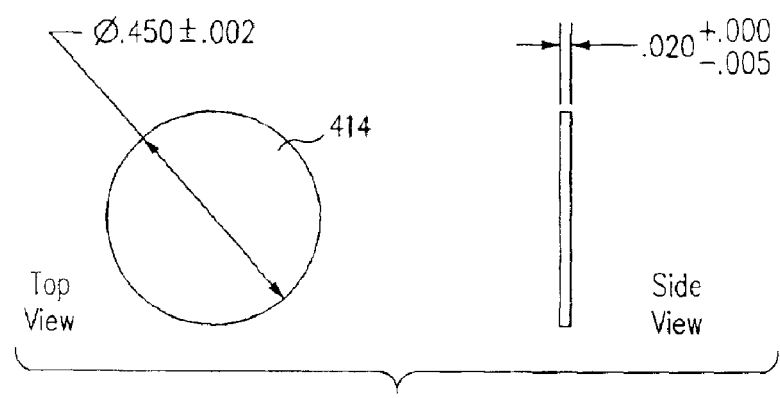
FIG. 15 shows exemplary design specifications for the second calibration flag of FIGS. 6 through 9 in accordance with an embodiment of the present invention.

Calibration flags 402 and 414 can be designed to reach their respective calibration temperatures by the appropriate selection of a TEC and the size and type of materials used for calibration flag assembly 600 (including calibration flags 402, 414). For example, FIGS. 10 through 14 show exemplary design specifications for calibration flag assembly 400 of FIGS. 4 and 5 and FIG. 15 shows exemplary design specifications for calibration flag 414 in accordance with an embodiment of the present invention. FIGS. 11 and 13 are bottom and top views, respectively, FIG. 10 is a side view of FIG. 11, FIG. 12 is a cross-sectional side view opposite that of FIG. 10 and taken along line A—A, and FIG. 14 is a cross-sectional front view taken along line B—B of FIG. 11.

Calibration flag assembly 400 and calibration flag 414, for the exemplary design specifications of corresponding FIGS. 10 through 15, are made of 6061-T6 aluminum. TEC 412 for the exemplary design specifications of FIGS. 10 through 15 is Marlow Ind. Inc.™ TEC model no. MI2012T, which is adhesive bonded to calibration flag assembly 400. However, it should be understood that this exemplary embodiment is not limiting and, for example, the type of TEC or the size, shape, and materials for calibration flag assembly 600 will vary depending upon the design parameters required and the calibration temperatures desired. For example, calibration flag assembly 400 and calibration flag 414 may be made of any type of thermally conductive material, such as for example a metal or metal alloy (e.g., copper or aluminum) or ceramic.

Figure 7:
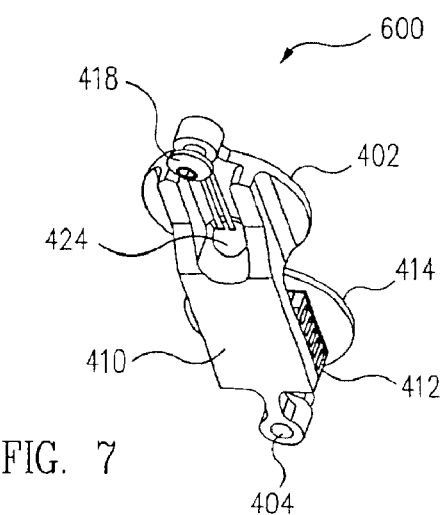
Figure 8:
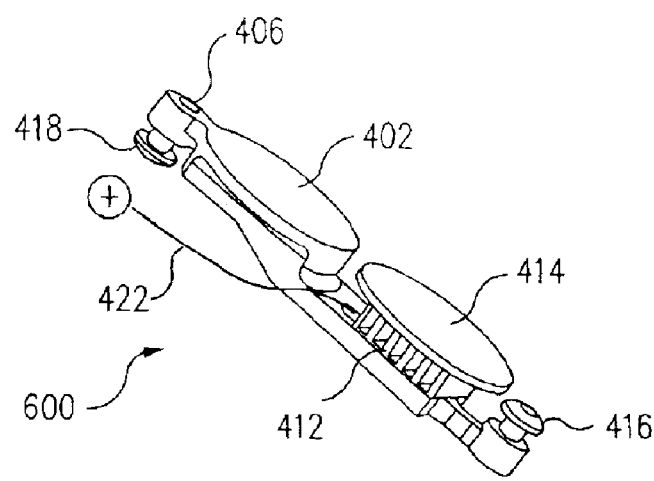
Figure 9:
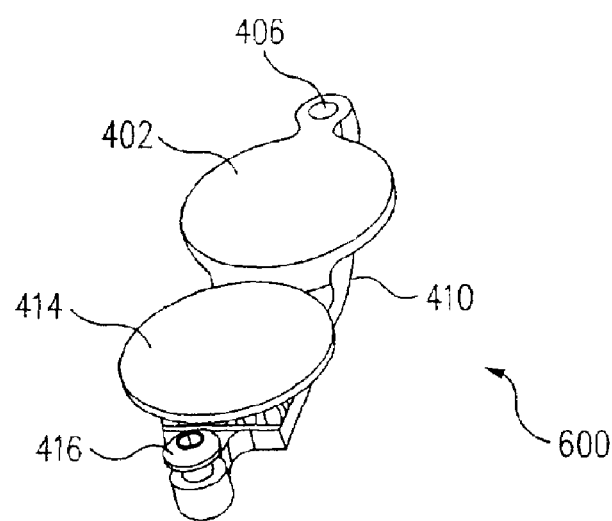

One or more temperature-measuring devices may be coupled to calibration flag assembly 600 to allow for the monitoring of the temperature of calibration flag assembly 600, including calibration flags 402, 414. For example, as can be seen in FIG. 7, a thermistor 424 is coupled to calibration flag assembly 600 to allow for temperature monitoring. Thermistor 424 can be used, as an example, to monitor the overall temperature of calibration flag assembly 600 to ensure that temperature elevation drift does not occur. This may occur when successive calibrations occur without allowing sufficient time for the calibration flag assembly 600 to return to its normal non-operating temperature range. A fan or other cooling device may optionally be provided, if rapid successive calibrations are expected to occur, to maintain calibration flag assembly 600 within a desired operating range.

Figure 16:
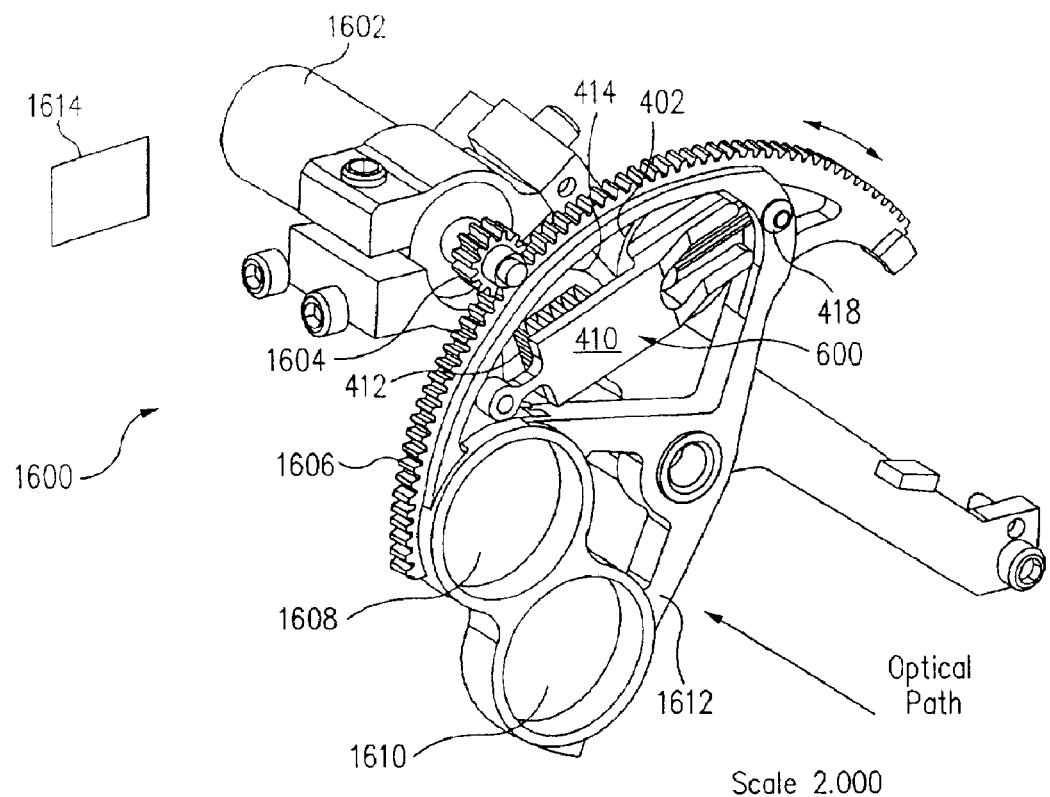
FIG. 16 shows a thermal imaging sensor calibration assembly, which incorporates the calibration flag assembly of FIGS. 6 through 9, in accordance with an embodiment of the present invention.

FIG. 16 shows an exemplary TISCA 1600, which incorporates calibration flag assembly 600 of FIGS. 6 through 9, in accordance with an embodiment of the present invention. TISCA 1600 includes a motor 1602 having a drive gear 1604 that meshes with teeth 1606 of an assembly 1612 to rotate assembly 1612 into the optical path (indicated by the optical path arrow in FIG. 16). For example, attached to assembly 1612 is calibration flag assembly 600 and optical filters 1608 and 1610.

Although motor 1602 is shown, any type of prime mover, which includes not only a motor but also for example a servo or a solenoid, may be employed to place calibration flag assembly 600 into the optical path. By controlling motor 1602, optical filters 1608, 1610 or calibration flags 402, 414 can be placed directly into the optical path. If optical filter 1608 or optical filter 1610 is placed into the optical path, the incident infrared radiation is appropriately filtered prior to reaching an infrared sensor 1614 of the thermal imaging system. If calibration flag 402 or calibration flag 414 is placed into the optical path, the incident infrared radiation traveling along the optical path is blocked and infrared sensor 1614 can calibrate using the known thermal radiation emitted from the calibration flag (i.e., either calibration flag 402 or calibration flag 414) inserted into the optical path.

More than one calibration flag assembly 600 can be employed within a thermal imaging system to provide any desired number of calibration points for the thermal imaging system's sensor. For example, assembly 1612 may be modified so that two calibration flag assemblies 600 could be attached to provide four calibration flags (i.e., four calibration points) for the thermal imaging system's sensor. Alternatively, one calibration flag assembly 600 could be operated to provide two calibration points and then, with TEC 412 continuing to operate, provide two more calibration points within the desired operating range of the sensor as calibration flag 412 continues to decrease in temperature as calibration flag 402 continues to increase in temperature. This technique could be extended to provide numerous calibration points within the sensor's operating range.

Figure 17:
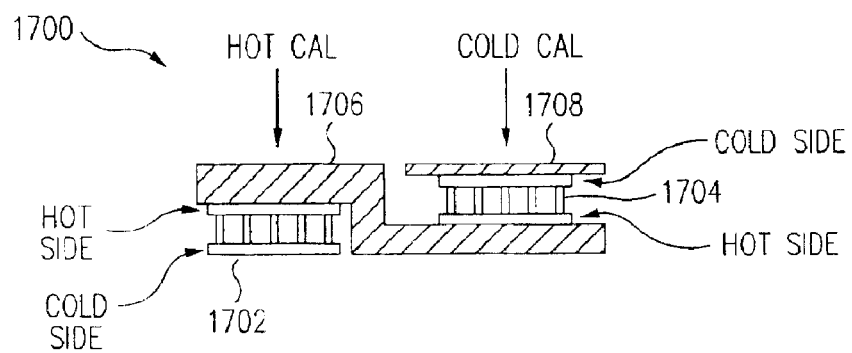
FIG. 17 shows a side view of a calibration flag assembly in accordance with an embodiment of the present invention.

FIG. 17 shows a side view of a calibration flag assembly 1700 in accordance with an embodiment of the present invention. Calibration flag assembly 1700 includes TECs 1702, 1704 and calibration flags 1706, 1708. By employing two TECs within calibration flag assembly 1700, a greater degree of temperature control can be maintained for calibration flags 1706, 1708 and a faster ramp-up to the desired temperature for calibration flag 1706 is possible. For example, TEC 1704 could be operated solely to cool calibration flag 1708 and heat calibration flag 1706. Alternatively, TEC 1704 could be operated in conjunction with TEC 1702 to heat calibration flag 1706 at a faster rate. By operating TECs 1702 and 1704 simultaneously, the amount of time to reach the desired difference in temperature between calibration flags 1706 and 1708 is reduced.

Furthermore, TEC 1702 could function to regulate or maintain the overall temperature of calibration flag assembly 1700. For example, TEC 1704 would be operated to cool calibration flag 1708 and heat calibration flag 1706. However, when the overall temperature of calibration flag assembly 1700 drifts below the desired operating temperature (e.g., after rapid successive calibrations), TEC 1702 could be operated to add heat to calibration assembly 1700.

It should be understood by the description herein that embodiments of the present invention provide numerous advantages over conventional techniques. For example, some embodiments provide a two-point calibration (i.e., two calibration flags at different temperatures) for a sensor within one temperature slewing cycle rather than two slewing cycles as with conventional techniques, which greatly reduces the time required to calibrate a thermal imaging sensor. Also some embodiments do not require active cooling, such as a heat sink or a fan, which reduces the associated size, cost, complexity, and power requirements of the calibration process.

Consequently, one or more embodiments described herein can be incorporated into a filter wheel (e.g., assembly 1612 of FIG. 16), which allows the elimination of a separate prime mover (e.g., motor) to rotate the calibration flags into the optical path. Alternatively, calibration assembly 600 may be moved into and out of the optical path independent of the optical filters by having its own prime mover (e.g., a motor, a servo, or a solenoid), but the time required for calibration is still greatly reduced.

Embodiments described above illustrate but do not limit the invention. It should also be understood that numerous modifications and variations are possible in accordance with the principles of the present invention. Accordingly, the scope of the invention is defined only by the following claims.

I claim:

1. A calibration flag assembly comprising:
    a main body;
    a first calibration flag coupled to the main body;
    a first thermoelectric cooler coupled to the main body; and
    a second calibration flag coupled to the first thermoelectric cooler.

2. The calibration flag assembly of claim 1, wherein the first calibration flag reaches a first calibration temperature and the second calibration flag reaches a second calibration temperature at approximately the same time upon operation of the first thermoelectric cooler.

3. The calibration flag assembly of claim 1, further comprising at least one temperature-sensing device coupled to the main body, the first calibration flag, or the second calibration flag.

4. The calibration flag assembly of claim 3, wherein the temperature sensing device comprises a thermistor.

5. The calibration flag assembly of claim 1, wherein the first thermoelectric cooler is coupled to the main body using an adhesive bond.

6. The calibration flag assembly of claim 1, wherein the main body, the first calibration flag, and the second calibration flag are made of a thermally conductive material.

7. The calibration flag assembly of claim 6, wherein the thermally conductive material comprises a metal, a metal alloy, or a ceramic material.

8. The calibration flag assembly of claim 1, further comprising a second thermoelectric cooler coupled to the main body, wherein the second thermoelectric cooler assists the first thermoelectric cooler to bring the first calibration flag to a desired calibration temperature.

9. The calibration flag assembly of claim 1, wherein the calibration flag assembly is incorporated into a thermal imaging system to assist in calibrating a sensor of the thermal imaging system.

10. The calibration flag assembly of claim 9, wherein the calibration flag assembly forms part of a filter wheel assembly that includes an optical filter, with the optical filter, the first calibration flag, or the second calibration flag being selectively insertable into an optical path of the thermal imaging system.

11. A method of calibrating a thermal imaging device with a calibration flag assembly having a main body, method comprising:
    operating a first thermoelectric cooler to adjust a temperature of a first calibration flag and a second calibration flag to a first calibration temperature and a second calibration temperature, respectively, wherein the first thermoelectric cooler and the first calibration flag are coupled to the main body and the second calibration flag is coupled to the first thermoelectric cooler;
    inserting into an optical path of the thermal imaging device the first calibration flag; and
    inserting into the optical path the second calibration flag.

12. The method of claim 11, further comprising:
    acquiring a first set of data from the thermal imaging device when the first calibration flag is inserted into the optical path; and
    acquiring a second set of data from the thermal imaging device when the second calibration flag is inserted into the optical path.

13. The method of claim 12, further comprising performing an offset adjustment or a gain adjustment using the first and second set of data acquired.

14. The method of claim 12, further comprising operating a second thermoelectric cooler to assist the first thermoelectric cooler in adjusting a temperature of the first calibration flag to the first calibration temperature.

15. A thermal imaging system comprising:
    a thermal imaging sensor adapted to receive thermal radiation through an optical path; and
    a calibration flag assembly that provides thermal calibration images, when inserted into the optical path, to assist in performing non-uniformity calibration, wherein the calibration flag assembly comprises:
        a main body;
        a first calibration flag coupled to the main body;
        a first thermoelectric cooler coupled to the main body; and
        a second calibration flag coupled to the first thermoelectric cooler.

16. The thermal imaging system of claim 15, wherein the first thermoelectric cooler is operable to adjust a temperature of the first calibration flag to a first calibration temperature and to adjust a temperature of the second calibration flag to a second calibration temperature.

17. The thermal imaging system of claim 16, further comprising at least one temperature-sensing device coupled to the calibration flag assembly.

18. The thermal imaging system of claim 17, further comprising a second thermoelectric cooler coupled to the calibration flag assembly, wherein the second thermoelectric cooler is operable to assist the first thermoelectric cooler in adjusting a temperature of the first calibration flag to the first calibration temperature.

19. The thermal imaging system of claim 15, further comprising means for inserting the calibration flag assembly into the optical path.

20. The thermal imaging system of claim 19, wherein the insertion means comprises:
    a prime mover; and
    an assembly coupled to the prime mover and to the calibration flag assembly, wherein the prime mover is operable to move the assembly, which results in the insertion of the first calibration flag or the second calibration flag into the optical path.

21. The thermal imaging system of claim 20, further comprising an optical filter coupled to the assembly, wherein the prime mover is operable to rotate the assembly, which results in the insertion of the optical filter, the first calibration flag, or the second calibration flag.

* * * * *